Mar. 3, 1925.  F. GARRISON  1,528,051
DIRECTION SIGNAL FOR AUTOMOBILES
Filed May 9, 1922   2 Sheets-Sheet 1

Inventor
Flint Garrison
By Semmes & Semmes
Attorneys

Mar. 3, 1925.
F. GARRISON
1,528,051
DIRECTION SIGNAL FOR AUTOMOBILES
Filed May 9, 1922   2 Sheets-Sheet 2
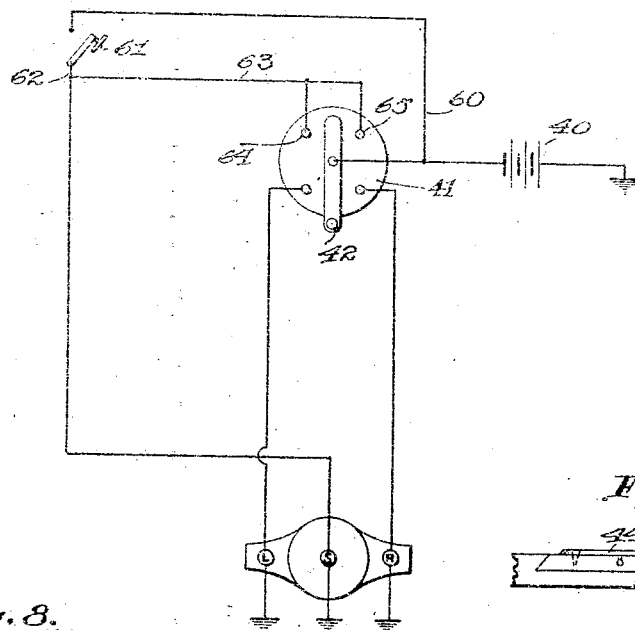
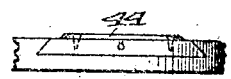
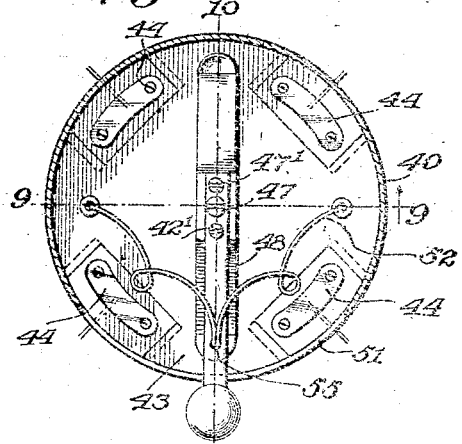
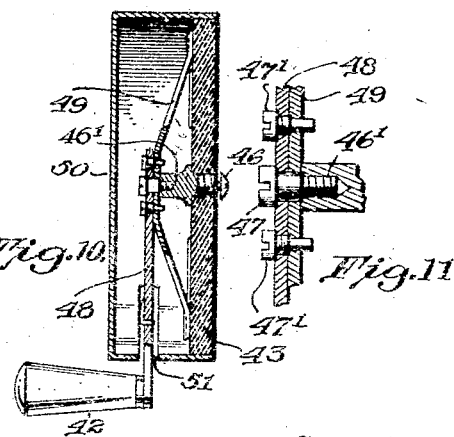
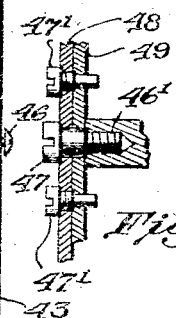
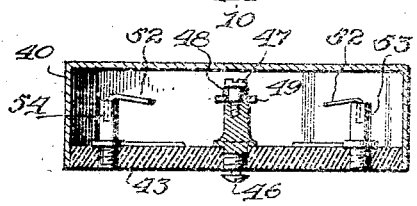
Inventor
Flink Garrison
By
Semmes & Semmes
Attorneys

UNITED STATES PATENT OFFICE.

FLINT GARRISON, OF ST. LOUIS, MISSOURI.

DIRECTION SIGNAL FOR AUTOMOBILES.

Application filed May 9, 1922. Serial No. 559,561.

*To all whom it may concern:*

Be it known that FLINT GARRISON, a citizen of the United States, residing at St. Louis and State of Missouri, has invented certain new and useful Improvements in Direction Signals for Automobiles, of which the following is a specification.

This invention relates to certain new and useful improvements in stop or direction signals for automobiles and it has particular reference to that class of such devices as employ signal devices adapted to be illuminated.

One of the objects of my invention is to so arrange several lights and a controlling means for same that they may be selectively operated to indicate either a warning, an intention to stop or the direction in which the driver intends to turn his car, or both at the same time.

Another object of my invention is to provide in a convenient place near the driver's feet, a pedal operating means for the operation of the stop signal alone, and at a convenient place adjacent the steering wheel, a hand operated means which will simultaneously operate the stop signal and one of the indicators, showing that it is the intention of the driver to turn his vehicle to the right or left, as the case may be.

A further object of my invention is to so construct a signal box that each of the lamps, with its appurtenances, may be readily removed from the casing as a unit, so that in case of damage to the bulbs, wires or other connections, the unit may be quickly removed and replaced in the signal box without the necessity of removing the latter from the vehicle.

With these and other objects in view which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings:

Figure 7 is a diagrammatic view of the electric wiring system for operating the signals;

Figure 8 is a plan view of the electric switch showing the cover or housing in section;

Figure 9 is a horizontal sectional view on the line 9—9 of Figure 8;

Figure 10 is a cross sectional view on the line 10—10 of Figure 9;

Figure 11 is an enlarged sectional view of the contact assembly;

Figure 12 is an edge view of the base member showing a contact slide, and

Figure 1:
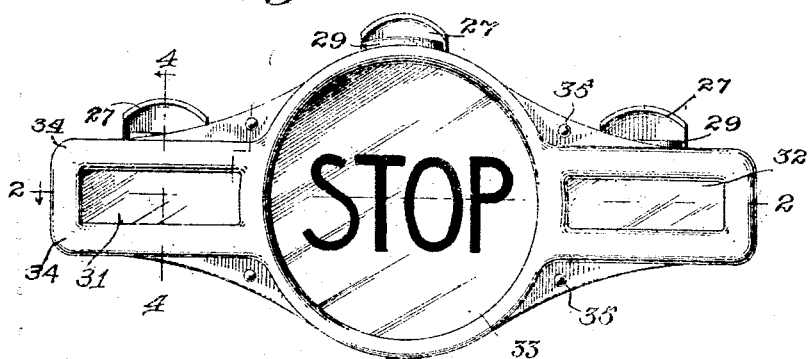
Figure 1 is a front elevation of my improved signal.
Figure 2:
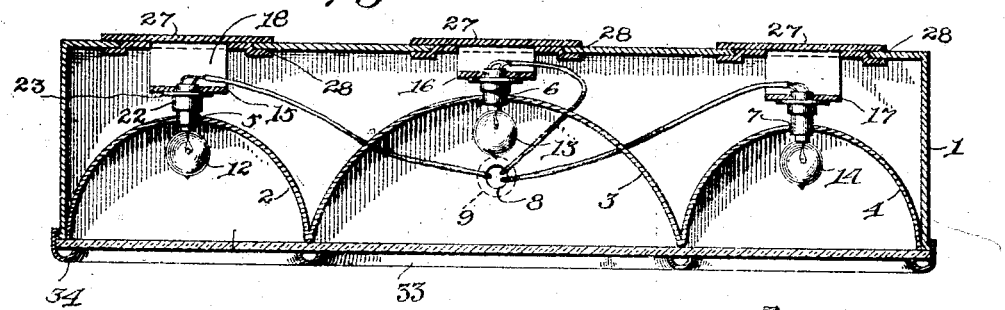
Figure 2 is a horizontal sectional view thereof along the line 2—2 of Figure 1.

The reference numeral 1, represents the signal box which is preferably of sheet metal, the same being of a general rectangular form in cross section, and the fore portion of the box is provided with several reflectors, 2, 3 and 4, entirely closed off, each from the other, as shown in Fig. 2. The walls of the reflectors are of a curved or semi-circular form in cross section and provided at the respective centers with openings 5, 6 and 7.

The bottom or floor of the signal box is provided with a screw-threaded aperture 8 adapted to be closed by knob 9, through which passes an electric cable 11 carrying the necessary wires for the operation of the respective lamps 12, 13, 14, and mounted on the rear wall of the signal box are mountings or fixtures 15, 16 and 17 for the lamp sockets.

Figures 3, 4, 5, 6, 13:
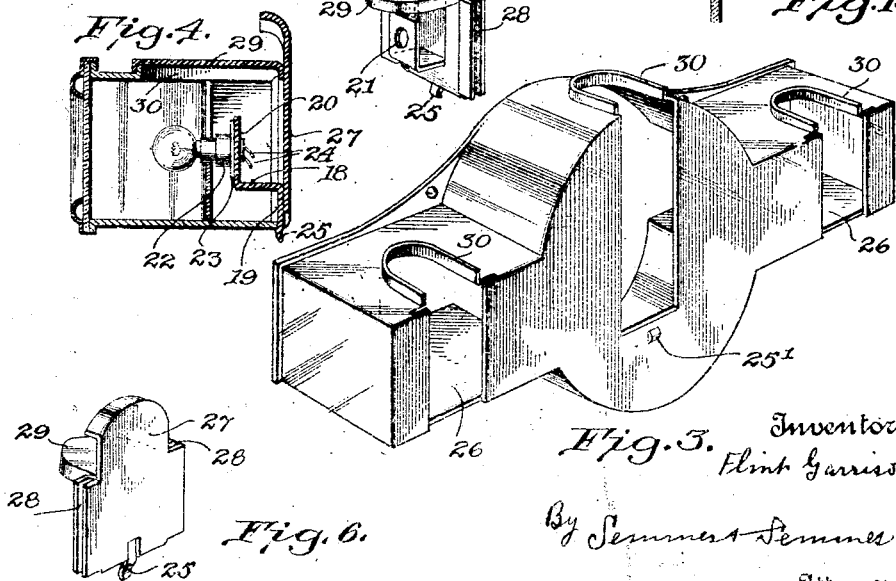
Figure 3 is a rear view in perspective with the lamps and lamp bracket or fixture removed.
Figure 4 is a detail sectional view along the line 4—4 of Figure 1.
Figure 5 is a detail perspective view of the lamp bracket.
Figure 6 is a perspective view of the rear thereof.
Figure 13 is a detail sectional view on the line 13—13 of Figure 1, showing the glass panel or face and the manner in which it is held in the casing.

Figures 4, 5 and 6 show in detail the structure of these mountings, each consisting of a plate 18, the respective ends of which are bent at opposite right angles 19 and 20, to its body. The end 20 is apertured at 21, into which the lamp socket 22 is threaded, there being a washer 23 of rubber or other insulating material interposed between the two, and from the back of the mounting, electric wires 24 lead into the socket. The end 19, at a point below the bottom or floor of the signal box, has a bent portion or tongue 25, which is adapted to catch under the floor and hold the mounting and the back cover to which it is attached tightly in place. Owing to the conformation of the enlarged chamber for the central lamp, the tongue cannot fit under the floor of the signal box, and in this instance a small lug 25' is provided on the lower portion of the outer rear wall of the box under which said tongue catches.

The signal box is provided in the rear of each lamp with an opening 26 into which the socket fixture fits, the opening being closed by a sliding cover 27 which is provided with a groove 28 on each side which extends to the height of the signal box and permits the cover to slide up and down in the opening. Extending at right angles to the sliding cover and toward the front of the signal box is a cap 29 adapted to fit over a semi-circular ridge 30 on the top of the signal box and encircle the opening, the purpose of the cap and ridge being to exclude rain or moisture from the interior of the signal box.

The top portion of the sliding cover extends higher than the cap 29 and is rounded off as shown so that it may be grasped and pulled upwardly to remove the socket mounting and lamp, should it or the wires leading therein become defective and need repair. With the construction shown, it will be observed that the entire lighting structure can be easily and readily removed and replaced in a moment's time.

Each of the reflecting surfaces is of course suitably constructed and burnished to project the rays of the light centered therein through the face of the respective glass panels, 31, 32, 33, which cover the front face of the signal box. These panels may be constructed each of a separate piece of glass, or one piece of glass may be cut to cover the whole face, the same being fitted in the metallic frame 34 which is suitably secured by screws 35, or otherwise to the front of the signal box. These glass panels may all be of the same color, such as for instance a rather dark brown or ruby glass, or the central panel (which may be circular or oval or otherwise in shape) upon which the word "Stop" is painted, stenciled or blown, may be of ruby glass and the others of contrasting colors. The side panels are shown of a rectangular shape, and if so desired may be reduced so as to appear more in the nature of a slit, or may be in the design of an arrow or hand pointing to the right or left. These panels may be marked with the words "Right" and "Left" respectively, or with the letters "R" and "L" thereon, indicating said words, or may be left blank as shown.

Figure 7 of the drawing shows a diagrammatic view of the wiring system and it is to be understood that it may be connected up with the magneto, or in any other proper and suitable manner. A battery 40, however, is shown, one of the wires from which leads to the switch 41 which is provided with an operating handle 42. Referring to the Figures 8, 9, 10, it will be seen that the switch consists of an insulated base 43, having four contact plates 44, and extending vertically from the center of the base and secured thereto by a screw 46 is a post 46' upon which is pivotally mounted, by means of a large screw 47 and smaller screws 47', an insulated operating bar 48, to which the handle 42 is secured. It is to be noted in this connection that the large screw 47 is screw-threaded at its lower end, but that part of its body immediately adjacent its head is not screw-threaded and extending through the apertured operating bar and the contact arm is screwed into a post 46'. This is the reverse of the structure shown in the side screws 47', for in the latter instance that part of the body immediately adjacent the head is screw-threaded into the bar, and that part which extends into the contact arm is not screw-threaded. The reason for this is that the two side screws are for the purpose of holding steadily in place the operating bar 48 against the contact arm, whereas the central screw 47 is used as a pivot upon which said bar turns upon the post 46' into which it is threaded. In case it is desired to remove the operating bar, it is simply necessary to remove the screw 47 when it may be readily lifted from the post and the contact arm. On the under side of said operating bar 48 is a metallic spring contact bar 49 whose ends are bent downward as seen, and is adapted to contact with the contact plates 44 above described. As will be seen on reference to Figures 8, 9 and 10, the switch is provided with a housing or cover 50 fitting over it, there being a slot 51 in the side thereof through which the contact arm 48 protrudes and on the end of said bar is a handle 42. As indicated in Figure 8, there is a spring 52 fastened at its ends to the posts 53 and 54, its center portion being fastened to the operating bar 48 at the point 55. The neutral position of the operating arm is that shown in Figure 8, and as soon as the hand is lifted from the contact arm in the act of operating the signal, said arm, by reason of the pressure of the spring 52, immediately returns to neutral position, and the connection with the illuminated lamps being broken, the lights are immediately and automatically extinguished.

From the wire connected to the switch is a lead wire 60 which is adapted to be connected to the brake pedal 61 where the connection is normally broken except upon the pressure of the foot thereon, when connection is made with a wire 62, having a branch line 63 leading to the two setscrews 64 and 65 on the switch. The current flows down the main line 62 to the middle lamp S of the signal box and to ground, so that when the brake pedal is operated to reduce speed, the circuit from 40 to 60, 61, 62, S and ground, is complete and the stop signal is operated, showing through the middle lamp and indicating to the machine following in the rear of the vehicle that the car carrying the signal is about to slow down or stop.

The other lamps are not electrically connected with the brake pedal and, therefore, are not operated by it. When, however, it is desired to show the signal stop and also to simultaneously indicate that the vehicle is about to turn to the right, upon turning the switch handle in that direction, connection is made through the oppositely disposed contact plates 44 and the wire circuits shown, closing the circuits which will illuminate the central stop signal and the longitudinal panel to the right thereof, both of which immediately become illuminated. When the handle is turned to the left the switch is moved in the opposite direction when the circuits are closed through the opposite contact plates which will illuminate the center stop signal and the longitudinal panel to the left.

In Figure 12 is shown the construction of the contact plates 44 with respect to the base upon which they are located. The contact plate frequently becomes pitted at its ends by reason of the great number of sparks emitted therefrom in the course of time and constant service, and it is necessary that new ones be substituted therefor. They are each fitted, as shown in said figure, to an insulated block which is beveled to fit within the base of the switch structure, thus securely holding it against dislocation when a change of plates and wires is made.

Figure 13 shows the manner in which the glass in the front of the signal is held in place by the metallic frame. It will be noted that the top of the signal box is turned at right angles so as to form a shoulder 66, and then extends upward for a short distance, that the metallic front frame to hold the glass in place extends slightly above it, and is then up-set so as to cover the upper edge thereof. A hole is drilled through the two metallic pieces in contact and they are held together by a bolt 67. The lower portion of this upper outer casing or frame is bent over in the form of a loop 68 at a point slightly above the angle 66, and the glass is held against this shoulder by the lower end of the loop. Should the glass become broken and it is desired to put in a new piece, it is very readily done by loosening the several screws in the outer frame, whereupon the same may be removed and a new glass substituted for the broken one, and the frame again bolted in place.

From the foregoing it will be observed that my device consists essentially of a central warning or danger signal with a direction indicator to the right and to the left of said central signal. The shape of these indicators may be varied to suit individual taste provided they indicate direction, the principle of the invention lying in the relationship of each of said direction indicators to the central danger signal when illuminated. The illumination of the central signal with the signal to the right and simultaneously therewith indicates that the driver of the vehicle intends to turn to the right, and the illumination of the central signal with the signal to the left and simultaneously therewith indicates that the driver of the vehicle intends to turn to the left.

Only one signal box is shown and this is intended to be located upon the rear portion of the vehicle, but a similar arrangement may be placed upon the front portion of the vehicle and the two operated synchronously so as to signal to the approaching as well as to the following vehicle.

While I have shown and described the preferred embodiment of my invention, I wish it to be understood that I do not confine myself to the precise details of construction herein set forth by way of illustration, as it is apparent that many changes and variations may be made therein by those skilled in the art, without departing from the spirit of the invention, or exceeding the scope of the appended claims.

I claim:

1. A device of the character described comprising a signal box having an open face and openings in its rear wall, a translucent closure for said face, a sliding cover for each opening, a lamp bracket so mounted upon each cover as to extend within the box, each lamp indicative by its position of a different signal, and means upon the cover whereby each lamp, bracket and cover as a unit may be manually removed and replaced.

2. A device of the character described comprising a signal box having an open face and openings in its rear wall, a translucent closure for said face, a plurality of compartments in said box formed by reflectors, a sliding cover for each opening, a lamp bracket so mounted upon each cover as to extend within the lamp compartment, means upon the cover whereby each lamp, bracket, and cover, as a unit may be removed and replaced, and a cap projecting from each cover and over the top of the opening and protecting the interior thereof from the weather.

3. A device of the character described comprising a signal box, having an open face and openings in the rear wall, a translucent closure for said face, a sliding cover for each opening, a lamp bracket so mounted upon each cover as to extend within the box, reflectors provided with openings to permit the lamp and socket to be inserted, and means upon the cover whereby each lamp bracket and cover as a unit may be manually removed and replaced.

In testimony whereof I affix my signature.

FLINT GARRISON.